April 21, 1964

J. J. ANTALEK 3,130,350

COUPLING DEVICE

Filed June 22, 1959

INVENTOR.
JOHN J. ANTALEK
BY
Mason, Kolehmainen, Rathburn & Wyss
ATTORNEYS

April 21, 1964 J. J. ANTALEK 3,130,350
COUPLING DEVICE
Filed June 22, 1959 2 Sheets-Sheet 2
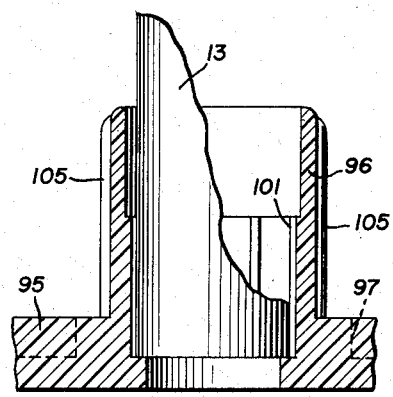
FIG. 5
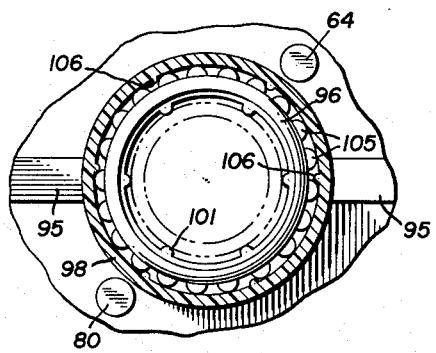
FIG. 7
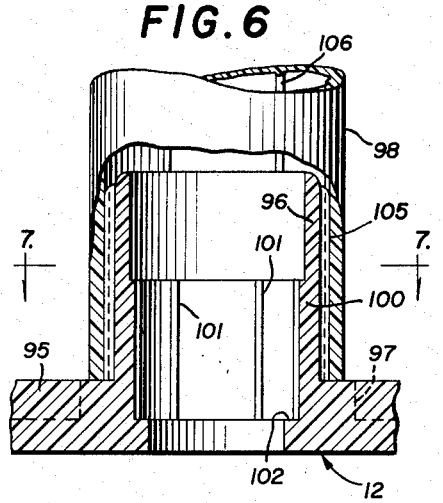
FIG. 6
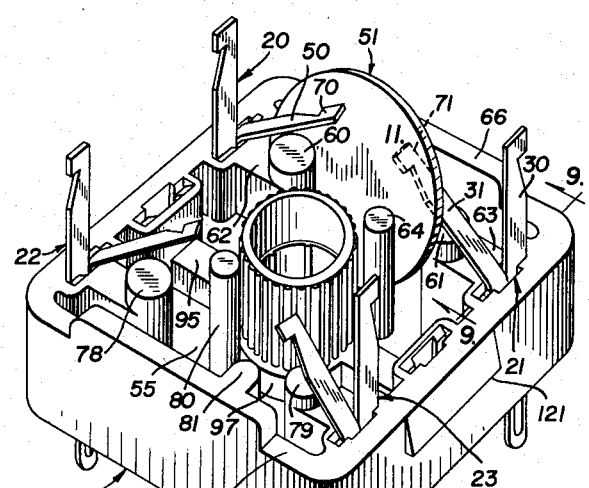
FIG. 8
FIG. 9
FIG. 10
FIG. 11
INVENTOR.
JOHN J. ANTALEK
BY
Mason, Kolehmainen, Rathburn & Wyss
ATTORNEYS form and one or more tuning capacitors are connected to the windings of the transformer, the entire assembly being positioned within a so-called shield can which is mounted to the chassis of the receiver or other electronic circuit.
United States Patent Office 3,130,350
Patented Apr. 21, 1964

3,130,350
COUPLING DEVICE
John J. Antalek, Glenview, Ill., assignor, by mesne assignments, to Thompson Ramo Wooldridge Inc., Euclid, Ohio, a corporation of Ohio
Filed June 22, 1959, Ser. No. 821,802
7 Claims. (Cl. 317—101)

The present invention relates to coupling devices such as transformers, and, more particularly, to tuned coupling devices and transformers of the type used in radio and television circuits. For example, the invention may be employed in a transformer arrangement wherein the windings of the transformer are wound on a tubular coil form and one or more tuning capacitors are connected to the windings of the transformer, the entire assembly being positioned within a so-called shield can which is mounted to the chassis of the receiver or other electronic circuit.

While many coupling device arrangements have been proposed in the past wherein the tuning capacitors are mounted within the shield can and are connected to the windings of the transformer, these arrangements have in general not been readily adaptable to mass production techniques. On the other hand, those constructions which have been designed with mass production methods in mind have not provided a suitably reliable electrical connection between the tuning capacitors and the transformer windings, such arrangements relying on pressure between the terminals of the transformer and the plates of the capacitors for establishing the requisite electrical connection. In one such prior art arrangement employing pressure to maintain electrical contact, the capacitors are in the form of plated mica strips which are positioned in a sandwich type of construction in the base of the transformer, connection to the terminals of the transformer being solely by the pressure exerted on the sandwich by means of a spring washer and stud arrangement extending through the center of the transformer base.

It is, therefore, an object of the present invention to provide a new and improved coupling device arrangement wherein good electrical contact is established and maintained between the electrodes of a disc type coupling unit and the terminals of the device, while, at the same time, providing a construction which may be readily manufactured on a mass production basis.

It is another object of the invention to provide a new and improved transformer assembly wherein one or more tuning capacitors can be conductively bonded to the terminals of the transformer by means of a single dip-soldering operation, or the like.

It is still another object of the present invention to provide a new and improved base construction which facilitates fabrication of transformer assemblies on a mass production basis.

A further object of the present invention is to provide a new and improved base member construction for a transformer assembly whereby either large or small diameter coil forms may be employed with the same base member to facilitate assembly of the transformers on a mass production basis.

It is a still further object of the present invention to provide a new and improved method of assembling transformer components wherein the tuning capacitors are first positioned on the base member and secured to the terminals of the transformer by means of a dip-soldering operation before the coil form which supports the transformer windings is secured to the base member.

It is a still further object of the present invention to provide a new and improved shield can arrangement for a transformer assembly which facilitates insertion of the transformer assembly within the can and which is readily secured to the base member of the transformer.

Another object of the present invention resides in the provision of a new and improved coupling device arrangement which is reliable in operation, simple in design and may be readily produced on a mass production basis.

Briefly, in accordance with one phase of the present invention, the base member of the coupling device is provided with a top opening recess within which the tuning capacitor, or other disc type unit having exposed electrodes on opposite sides thereof, is positioned on edge and is held in position by means of inturned arm portions of the terminal members of the device which are secured to the base member. These arm portions engage the edge positioned disc type unit at points spaced above the top surface of the base member so that the base member with a disc unit held therein may be inverted and conductively bonded to the inturned terminal arm portions by means of a single dip-soldering operation.

If the coupling device is a transformer the coil form is secured to the base member after this dip-soldering operation and the ends of the windings on the coil form are then secured to the transformer terminals. In accordance with a further feature of the present invention, the base member may be provided with a tubular coil form mounting sleeve which is adapted to receive either a large diameter or a small diameter coil form so that a universal mounting arrangement for different size coil forms is provided. In accordance with a still further phase of the present invention, the shield can of the coupling device is provided with straight sides and a central opening in the top thereof defined by means of a vertically extending sleeve portion, the portion of the shield can connecting the straight sides and this sleeve portion being inclined so as to act as a guide for the upper end of the coil form and facilitate insertion of the upper end of the coil form into the central opening upon assembly of the coupling device in the can. In accordance with still another phase of the present invention, a snap locking arrangement is provided for securing the shield can on the base member without requiring any lugs to be turned down to hold the coupling device within the can.

The invention, both as to its organization and operation, together with further objects and advantages thereof, will best be understood by reference to the following detailed description taken in connection with the accompanying drawings, in which:

FIG. 5 is a sectional view on an enlarged scale taken along the lines 5—5 of FIG. 3 and showing a relatively small diameter coil form positioned on the base member;

FIG. 6 is a sectional view similar to FIG. 5 but showing the manner in which a relatively large diameter coil form is supported on the base member;

FIG. 7 is a sectional view taken along the lines 7—7 of FIG. 6;

FIG. 8 is a perspective view of the base member of FIG. 1 showing the manner in which a capacitor or other disc type unit is supported therein prior to the dip soldering operation;

FIG. 9 is a sectional view taken along the lines 9—9 of FIG. 8;

FIG. 10 is a sectional view taken along the lines 10—10 of FIG. 9; and

FIG. 11 is a sectional view taken along the lines 11—11 of FIG. 4.

Figure 1:
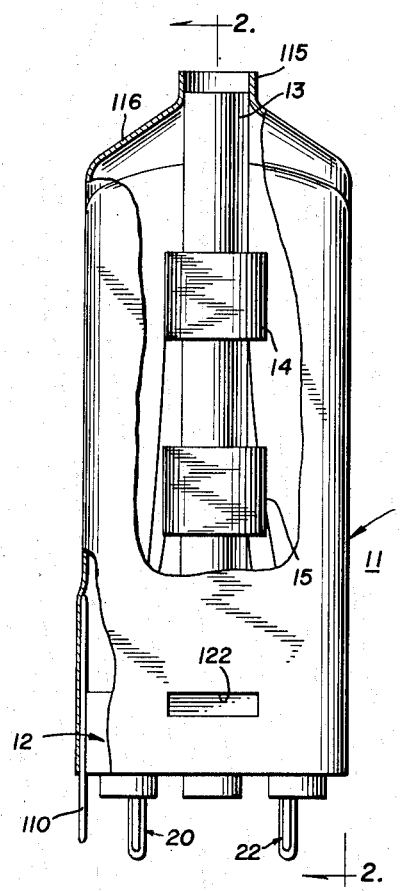
FIG. 1 is a front elevation view of a coupling device embodying the features of the present invention, portions of the shield can of this assembly being broken away to show certain features of construction.

Referring now to the drawings, there is shown a coupling device arrangement according to the present invention which is indicated generally at 11 and comprises a base member indicated generally at 12, a coil form 13 which is positioned on the base member 12 and carries a pair of multilayer coils 14 and 15 thereon, and a shield can indicated generally at 16. The coils 14 and 15 may conveniently be wound of insulated copper wire on the coil form 13 and the ends of these coils are secured to terminal members indicated generally at 20, 21, 22 and 23, these terminal members being secured in the base member 12 by means to be discussed in more detail hereinafter. It will be understood that although the transformer shown in FIG. 1 utilizes a pair of coils 14 and 15, a greater or lesser number of coils may be provided on the form 13 if desired.

Figure 2:
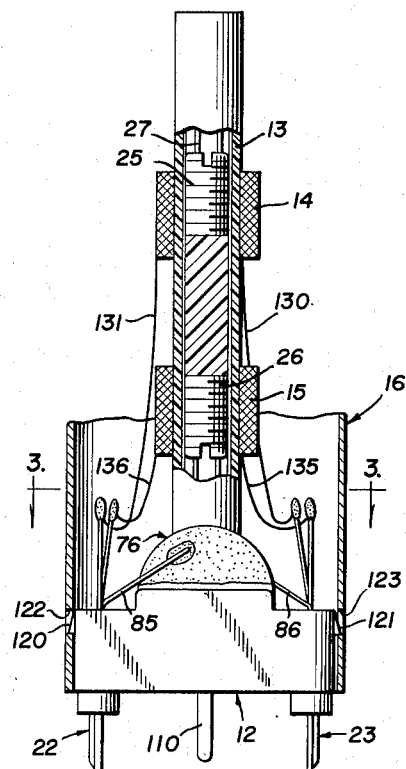
FIG. 2 is a right side elevation view of the coupling device with the shield can broken away and a portion of the coil form assembly being shown in section through the center line thereof.

In order to adjust the magnetic coupling between the coils 14 and 15 as well as to change the inductance of each of these coils, the ferromagnetic core members 25 and 26 (FIG. 2) may be adjustably positioned in the coil form 13. The coil form 13 may be provided with a plurality of thin ribs 27 which extend longitudinally along the inner surface of the coil form 13 whereby the cores 25 and 26 may be adjustably positioned with respect to the coils 14 and 15, this construction of the coil form 13 being described and claimed in U.S. Letters Patent No. 2,838,738, granted to John J. Antalek and Robert W. Saville on June 10, 1958. While such construction of the coil form 13 cooperates with the specific form of base construction of the present invention, it will be understood that any other suitable coil form and tuning slug arrangement may be employed whereby a variable inductance device is provided insofar as the other features of the present invention are concerned. Furthermore, it will be understood that the coils 14 and 15 need not be variable insofar as the present invention is concerned although it is customary to provide variation of the transformer windings to facilitate alignment of the transformer once it is assembled in its electronic circuit.

Considering now the manner in which the tuning capacitors or other disc type units in the assembly of the present invention are supported on the base member 12 and are conductively bonded to the transformer terminals, attention is first directed to the terminals 20 to 23, inclusive, themselves and more particularly to FIGS. 9 and 10 which show the details of the terminal 21. As there shown, the terminal 21 is provided with a bifurcated upper portion comprising a normally vertically positioned arm portion 30 and an inturned arm portion 31, these bifurcations or arm portions 30 and 31 being positioned above the upper rim 32 of the base member 12.

The terminal 21 is mounted in a vertically extending slot 35 provided in the base member 12, similar slots 36, 37 and 38 being provided respectively for the terminals 20, 22 and 23. Each of these slots, such as the slot 35, is provided with a groove 40 which is adapted to receive an outwardly protruding reinforcing rib 41 provided in the lower portion of the terminal member 21 and there is also provided a groove 42 in the other side of the slot 35, the groove 42 having a sloping shoulder or step 42a at the upper end thereof over which a tang or projection 44 which is struck out of the body portion of the terminal 21 is adapted to snap and thereby retain the terminal 21 in position after it has been inserted into the slot 35 from the top of the base 12, as best shown in FIG. 10. The slot 35 is also provided with shoulders 35a at the ends thereof and the terminal 21 is provided with a relatively wide portion above the tang 44 so that this wide portion is held against the shoulders 35a when the tang 44 is snapped in place, as best shown in FIG. 9. With this construction the terminal 21 is rigidly held and is prevented from twisting within the slot 35 so that the inturned arm portion 31 thereof can exert a substantial size thrust on the edge mounted disc unit as will now be described.

In accordance with an important feature of the present invention, the inturned arm portions of opposed pairs of terminal members are employed to support a tuning capacitor or other disc type unit on edge on the base member 12 by engagement with opposite sides of the tuning capacitor. More particularly, considering the pair of terminals 20 and 21, the inturned arm portion 50 of the terminal 20 and the inturned arm portion 31 of the terminal 21 are adapted to engage the opposite sides of a disc type tuning capacitor indicated generally at 51, the capacitor 51 being supported on edge on the base member 12.

The disc type unit 51 comprises a wafer-like self-supporting base portion 52 (FIG. 11) constructed of a solid dielectric material, such, for example, as a ceramic material, the plates of the capacitor unit 51 consisting of two metallic layers 53 and 54 which are provided on the opposite flat surfaces of the dielectric member 52, the edge of the dielectric member 52 being, however, free from conductive material. It will thus be understood that the plates or electrodes 53, 54 are separated by the dielectric material 52 and having a capacitance therebetween which is dependent upon the areas of the plates and the thickness and dielectric constant of the base member 52. If it is desired, the capacitor 51 may be constructed by means of the arrangement disclosed in the copending application of Hal F. Fruth, S. N. 514,880, filed June 13, 1955, wherein there is disclosed an arrangement in which the dielectric core member is coated over the entire surface thereof with a conductive layer and thereafter the conductive material is removed from the edge of the disc to provide a capacitor consisting of conductive surface portions separated by the dielectric core member. It will also be understood that the capacitor 51 may alternatively be formed by painting or printing a conductive varnish or metal on the opposed flat surfaces of the dielectric disc 52 so as to provide the capacitor plates 53 and 54, insofar as the features of the present invention are concerned. However, it is pointed out that in accordance with an important feature of the present invention, the opposed electrodes 53 and 54 of the disc type unit, such as the capacitor 51, are not coated with any insulation or impregnation material but instead are left bare so as to permit the inturned arm portions 50 and 31 to establish electrical contact thereto.

Considering now the manner in which the capacitor 51 is supported on the base member 12, the base member 12 is provided with a top opening recess, the edge of the capacitor 51 resting on the bottom surface 55 of this top opening recess. In order to facilitate positioning of the capacitor 51 on edge on the base member 12 with the arm portions 50 and 31 in engagement with opposite sides thereof, the base member 12 is provided with a pair of opposed positioning posts or studs 60 and 61 adjacent the terminals 20 and 21 which extend upwardly from the bottom surface 55 of the recess in the base member 12, the studs 60 and 61 being connected to the side wall of the base member 12 by means of the web portions 62 and 63 (FIG. 8). In addition, a further positioning post or stud 64 extends upwardly from the bottom surface 55 of the top opening recess in the member 12, the stud 64 being spaced from the positioning stud 61, and an inwardly projecting vertically extending rib or lug portion 65 (FIG. 3) is provided on the outer wall 66 of the base member 12 adjacent to but spaced from the positioning stud 60.

Figure 3:
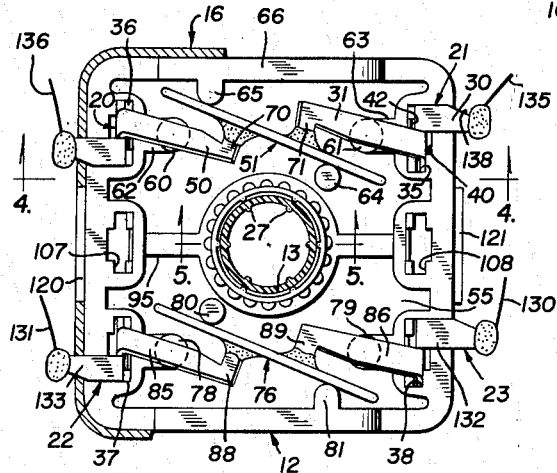
FIG. 3 is a sectional view taken along the lines 3—3 of FIG. 2.

It will thus be seen that the positioning posts 60, 61 and 64 and the projecting lug 65 define an elongated narrow slot which is adapted to receive the tuning capacitor 51 on edge and loosely supports the same on the base member 12. However, it will also be noted that as soon as the arm portions 50 and 31 are moved into engagement with the opposite sides of the capacitor 51 these arm portions exert a twisting action on the disc capacitor 51, due to the fact that the arm portions 50 and 31 engage the capacitor at laterally spaced points thereon, so that the capacitor 51 is urged against the side of the positioning post 64 and is also urged against the side of the projecting lug 65, as best illustrated in FIG. 3. Furthermore, it will be noted that since it is necessary to move the arm portions 50 and 31 sidewise away from their initial positions when the tuning capacitor is positioned therebetween these arm portions continuously exert a sidewise thrust on the opposed sides of the capacitor 51 and function to hold this capacitor in an upright position on the base member 12. In this connection it will be noted that the arm portions 50 and 31 are provided respectively with the oppositely directed right angle end portions 70 and 71 which actually contact the opposed bare electrodes on opposite sides of the capacitor 51 so that contact to the plates of the capacitor 51 is established through the end portions 70 and 71 at a localized area on the plates.

Figure 4:
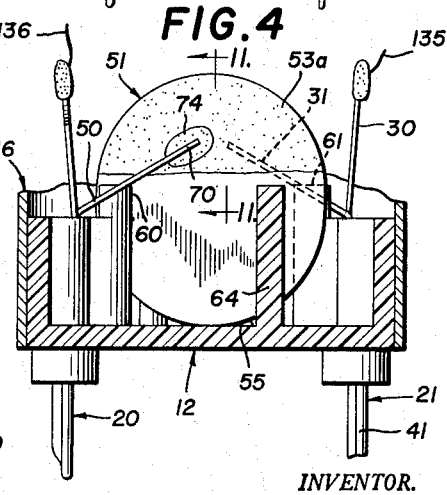
FIG. 4 is a sectional view taken along the lines 4—4 of FIG. 3.

While the post 64 and lug 65 are of substantial height so that when the capacitor 51 is urged into engagement with the sides thereof the capacitor is held upright on the base 12, it will be noted that the contact making end portions 70 and 71 of the arm portions 50 and 31, respectively, contact the bare plates of the capacitor 51 at points spaced considerably above the upper surfaces of the base member 12 including the tops of the posts 60, 61, 64 and the lug 65. This construction is provided so that in accordance with a further important feature of the present invention a good conductive bond may be established between the end portions 70 and 71 and the electrodes of the capacitor 51 and reliance is not placed solely on a pressure contact between these members to maintain good electrical connection. More particularly, after the capacitor 51 has been inserted into the base member 12 and the arm portions 50 and 31 moved into engagement therewith, it is held in this position due to the above described twisting action which holds the capacitor against the post 64 and the lug 65. This pressure is sufficient that the base member may be inverted without the capacitor 51 dropping out of its slot in the base member 12. Accordingly, after the capacitor 51 has been positioned in the base member as shown, for example, in FIG. 8, the base member is inverted and is dipped into a pot of solder to a depth sufficient to submerge the end portions 70 and 71 but not to a depth sufficient to cause any portions of the base member 12 itself to come in contact with the melted solder. The base member 12 is then removed from the molten solder with the result that the end portions 70 and 71 are conductively bonded to the opposed electrodes of the capacitor 51. More particularly, the entire upper surface of each of the plates 53 and 54 is covered with a film of solder 53a and 54a (FIG. 11) and a fillet of solder is provided around each of the end portions 70 and 71 so that a strong physical as well as an electrically conductive bond is established between the end portions 70 and 71 and the conductive plates 53 and 54 of the capacitor 51. One such fillet of solder is indicated at 74 in FIG. 4 whereby the end portion 70 of the arm portion 50 is conductively bonded to the plate 53 of the capacitor 51. However, it will be noted that while the dip-soldering operation completely covers the upper portions of the plates 53 and 54 of the capacitor 51, the solder does not adhere to the edge of the dielectric disc 52 so that the plates of the capacitor 51 are not conductively shorted together. Furthermore, the solder films 53a and 54a do not appreciably change the capacitance of the capacitor 51 since they do not affect either the area of the plates 53 and 54 or the spacing thereof.

The base member 12 is also arranged to support a second tuning capacitor, indicated generally at 76, between the spaced apart terminals 22 and 23. More particularly, the positioning posts 78 and 79 are provided adjacent the terminals 22 and 23, respectively, these posts being similar to the positioning posts 60 and 61 described above, a positioning post 80 is positioned in spaced relation to the post 78 and a vertically extending lug 81 on the base 12 is provided in spaced relation to the post 79. The inturned arm portions 85 and 86 of the terminals 22 and 23, respectively, are provided with oppositely directed end portions 88 and 89 which are adapted to engage the opposite sides of the capacitor 76 at laterally spaced points thereon so that a twisting action is exerted on this capacitor and it is urged against the sides of the positioning post 80 and the lug 81 so that it is held on edge in the base 12, as shown in FIG. 3.

In the actual manufacture of the transformer in accordance with the present invention both the capacitors 51 and 76 are assembled on the base 12 and positioned between the restraining arm portions of the adjacent terminal members before the dip-soldering operation is performed. Accordingly, all four solder connections may be performed in one dip-soldering operation so that a conductive bond is established to both of the tuning capacitors of the transformer in a single soldering operation. Furthermore, it will be appreciated that a number of such base assemblies with tuning capacitors mounted thereon may be mounted in a common jig and inverted so that they are all soldered in a single operation thus effecting a material saving in manufacturing time and labor over previous arrangements. Attention is also directed to the fact that the dip soldering operation whereby the terminal members of the transformer are conductively bonded to the electrodes of the tuning capacitors is performed before the coil form 13 is assembled on the base member 12, and before the leads from the coils positioned on the coil form are connected to the vertically extending portions of the terminal members. In this connection it will be understood that the vertically extending portions of the terminal members 20 to 23, inclusive, such as the vertical bifurcation 30 of the terminal 21, are also immersed in the molten solder during the above described dip-soldering operation. However, this operation only has the effect of tinning the ends of the vertically extending terminal portions, such as the portion 30, and thus facilitates the connection of the coil leads to these terminals at a later time. However, if desired, the vertically extending terminal portions, such as the portions 30, may be bent outwardly so that they do not contact the solder during the dip-soldering operation if, for any reason, it is not desired to tin these terminal portions.

Considering now the manner in which the coil form 13 is assembled on the base member 12, a transverse reinforcing rib 95 is provided across the bottom of the recess in the base member 12 in the center of which rib there is provided an annular mounting sleeve 96 which extends upwardly from a circular base portion 97. The mounting sleeve 96 is arranged to support either the relatively small diameter coil form 13 or a relatively large diameter coil form 98 (FIGS. 6 and 7). More particularly, in order to receive the relatively small diameter coil form 13 within the mounting sleeve 96, this sleeve is provided with a stepped portion 100 of somewhat smaller internal diameter which extends only partially up the length of the sleeve 96, the stepped portion 100 being provided with a series of vertically extending inwardly projecting ribs 101 which function to grip the outer surface of the coil form 13 when it is inserted into the step portion 100 of the mounting sleeve 96. An inwardly extending shoulder 102 is provided at the bottom of the mounting sleeve 96 so as to seat the bottom of the coil form 13. It will be noted that the coil form 13 is secured within the mounting sleeve 96 by engagement with only the stepped portion 100 thereof so that the outward force exerted on the mounting sleeve 96 when the coil form 13 is inserted therein is applied only to the base portion of the sleeve and hence cracking or splitting of the sleeve is avoided.

The mounting sleeve 96 is also provided with a series of closely spaced vertically extending ribs 105 on the outer surface thereof. The ribs 105 are provided for the purpose of interlocking with the internal longitudinally extending ribs 106 of a relatively large diameter coil form 98 when this coil form is inserted over the outside of the mounting sleeve 96, the coil form 98 being forced over the sleeve 96 until it seats on the circular base portion 97. Due to the interlocking of the ribs 105 and 106 the coil form 98 is not only firmly seated on the mounting sleeve 96 but is also prevented from rotating with respect to the base member 12. In this connection it will be understood that the ribs 106 may serve the additional function of adjustably positioning the tuning slugs within the coil form 98, as described in the above identified Patent No. 2,838,-738. Also, it will be noted that the positioning posts 64 and 80 are spaced from the outside ribs 105 on the mounting sleeve 96 by an amount sufficient to permit the insertion of the large diameter coil form 98 over the sleeve 96. It will also be noted that the positioning posts 64 and 80 serve the additional purpose of providing a positioning means for the tuning capacitors while permitting the coil form 98 to be inserted over the mounting sleeve 96 after the tuning capacitors have been soldered in place in the manner described above.

The coils 14 and 15 may be wound on the coil form 13 either before or after this coil form is positioned on the base member 12. However, it will be understood that if the coils 14 and 15 are wound on the coil form 13 after this coil form is secured to the base member 12, the upstanding terminal portions, such as the portion 30 of the terminal members of the transformer are preferably bent outwardly so as to provide clearance for the coil winding mechanism in the event that the coil is wound relatively close to the base member 12. It has been found that the procedure of winding the coils 14 and 15 after the coil form 13 has been secured to the base member 12 results in a somewhat simpler manufacturing technique in that the ends of the respective coils can first be secured to the corresponding upstanding terminal portions so that the coil winding operator can trace the start and finish coil leads more easily. In this connection it will be understood that the start and finish leads 130 and 131 of the coil 14 are connected to a pair of the terminal members which are positioned on opposite sides of the recess in the base member so that the tuning capacitor connected between the inturned arm portions of these terminal members is connected across the coil. Thus, the leads 130 and 131 are connected to the vertically extending portions 132 and 133 of the terminals 23 and 22, respectively, so that the tuning capacitor 76 is connected across the coil 14. In a similar manner the leads 135 and 136 may be connected to the upstanding terminal portions of the terminals 21 and 20, respectively, so as to connect the capacitor 21 across the winding 15. It will be noted that the upstanding terminal portions, such as the portion 30 of the terminal 21, are provided with a notch 138 in the upper end thereof to facilitate connection of the coil leads to these terminals, it being necessary only to hook the coil leads over the notches 138 and wrap the lead one or two turns around the terminal. After the coil leads have been secured to the upstanding terminal portions in the manner described above, they may be conveniently dip-soldered to these terminals by bending the terminals outwardly so that they extend beyond the edge of the base member 12. When so bent the terminals with coil leads attached thereto may be lowered into a pot of molten solder so that the coil leads on one side of the base member may both be soldered simultaneously to their respective terminals, it being understood that the transformer assembly is not lowered into the solder sufficiently to permit the solder to contact either the base member 12 or the coils on the coil form 13. The transformer assembly may then be turned over and the terminals of the opposite side of the base member soldered by a similar dip-soldering operation, after which all four of the terminal members are bent back to their initial vertical position. The transformer assembly is then ready for the shield can 16 to be assembled thereon.

In this connection it will be noted that the base member 12 is provided with a pair of terminal receiving slots 107 and 108 within which may be positioned terminals similar to the terminals 20 to 23, inclusive, but which are, however, not provided with an inturned arm portion such as the arm portion 31 of the terminal 21. These intermediate terminals may be employed to establish connection to other desired connection points on the coils positioned on the coil form 13, such, for example, as a center tap for either of the coils 14 or 15. However, since no tuning capacitor is to be connected across these intermediate terminals the inturned arm portions thereof are not required.

Considering now the manner in which the shield can 16 is formed in accordance with the present invention, it is first pointed out that this shield can may be provided with a grounding lug or terminal 110 which may be secured to the bottom portion of the can 16 by any suitable means such as rivets or the like, the ground strap 110 extending downwardly along the side of the base member 12 so that it projects below the bottom of the shield can 16. In the center of the top portion of the shield can 16 there is provided a vertically extending tubular portion 115 which defines an opening adapted to receive the upper end of the coil form 13. In accordance with a further feature of the invention, the entire top portion 116 of the shield can intermediate the straight sides thereof and the central sleeve 115 is formed so that it slopes inwardly at a substantial angle to the horizontal to form a conically shaped top. Accordingly, as the shield can 16 is inserted over the transformer assembly and the upper end of the coil form engages the conical section 116, this section acts as a guide for the upper end of the coil form and facilitates insertion thereof into the sleeve portion 115 as the shield can is moved downwardly to enclose the base member 12. Since the entire top portion of the shield can 116 is conically shaped no transverse surfaces are presented to the end of the coil form 13 with the result that this coil form slides easily into the sleeve 115, at which point the coil form 113 is accurately centered with respect to the shield can 16 and the base 12. As the shield can 16 is forced downwardly over the base member 12 a snap locking arrangement is provided so that the shield can is secured to the base member 12 without requiring the bending of any lug portions or other arrangements for holding the shield can in place. More particularly, there is provided on two opposed sides of the base member 12 a pair of wedge-shaped projections 120 and 121 which cooperate with a pair of elongated transverse slots 122 and 123 in the shield can 16 to hold the shield can in place. As the shield can is inserted over the base member 12 the wedge portions 120 and 121 force the sides of the shield can outwardly until the shoulders thereof have been snapped into place in the slots 122 and 123 at which point the shield can becomes secured to the base member 12 and cannot readily be removed due to the fact that the shoulders of the wedges 120 and 121 engage the bottom edges of the slots 122 and 123 and prevent such removal.

While particular embodiments of the invention have been shown, it will be understood, of course, that the invention is not limited thereto, since many modifications may be made, and it is therefore contemplated by the appended claims to cover any such modifications as fall within the true spirit and scope of the invention.

What is claimed as new and is desired to be secured by Letters Patent of the United States is:

1. In a device of the character described, a base member of insulating material, a pair of upstanding spaced apart positioning members on said base member, a disc capacitor having opposed electrodes separated by a layer of dielectric, and a pair of terminal members supported on said base member and having inturned arm portions, said arm portions being conductively bonded to opposite sides of said capacitor at points which are spaced laterally apart to exert a force couple on said capacitor and resiliently urge the sides of said capacitor against said positioning members so that said capacitor is held in a generally vertical plane.

2. An assembly for use with an inductance device comprising a base member of insulating material having a top opening recess therein, said base member having a tubular mounting sleeve positioned in said recess and extending upwardly from the bottom thereof, said base member also having a vertically extending positioning lug positioned in said recess and spaced from said sleeve, a pair of terminal members positioned on opposite sides of said recess and having inturned arm portions extending over said recess, and a disc capacitor positioned in said recess with the bottom edge thereof resting on the bottom of said recess, said arm portions of said terminal members engaging opposite sides of said capacitor at laterally spaced points so that said capacitor is held against said positioning lug and the side of said recess by virtue of the twisting force exerted thereon by said laterally spaced inturned arm portions, said lug being spaced from said mounting sleeve by an amount sufficient to permit insertion of a coil form over said sleeve.

3. In combination, a base member of insulating material, means defining a pair of spaced apart positioning members extending upwardly from said base member, a pair of terminal members supported on said base member and having inturned arm portions, a disc capacitor having opposed metallic electrodes separated by a layer of dielectric and positioned with the bottom edge thereof resting on said base member, said arm portions of said terminal members engaging opposite sides of said disc capacitor at points which are spaced apart laterally to exert a force couple on said capacitor so that said capacitor is resiliently held against said positioning members, and means conductively bonding said arm portions to the outer surfaces of said electrodes.

4. In combination, a base member of insulating material, a pair of slots extending through said base member, terminal members positioned in each of said slots, each of said terminal members having a bifurcated upper portion above said base member, one bifurcation of each of said terminal members extending inwardly towards the other terminal member, and a disc capacitor having opposed electrodes separated by a layer of dielectric, said extending bifurcation being conductively bonded to opposite sides of said disc capacitor at points which are spaced apart laterally to exert a force couple on said disc capacitor and resiliently urge the sides of said capacitor against said positioning members so that said capacitor is held in a generally vertical plane.

5. The combination recited in claim 1, wherein said inturned arm portions are conductively bonded to opposite sides of said capacitor at points above the upper ends of said positioning members.

6. The combination recited in claim 4, wherein said inturned bifurcations in their unstressed condition are positioned over the inner edges of said positioning members and are twisted laterally by engagement with the opposite sides of said disc capacitor to resiliently urge the same against said positioning members.

7. The combination recited in claim 1, wherein said inturned arm portions of said terminal members are provided with offset end portions which are conductively bonded to the opposed sides of said disc capacitor.

References Cited in the file of this patent

UNITED STATES PATENTS

| | | |
|---|---|---|
| 2,069,633 | Tripp | Feb. 2, 1937 |
| 2,298,275 | Bohren | Oct. 13, 1942 |
| 2,542,651 | Franklin | Feb. 20, 1951 |
| 2,648,031 | Lang | Aug. 4, 1953 |
| 2,706,798 | Kodama | Apr. 19, 1955 |
| 2,760,058 | Gross | Aug. 21, 1956 |
| 2,769,119 | Martin | Oct. 30, 1956 |
| 2,777,193 | Albright | Jan. 15, 1957 |
| 2,836,805 | Goldsmith | May 27, 1958 |
| 2,869,041 | DeCola | Jan. 13, 1959 |
| 2,876,402 | Billings | Mar. 3, 1959 |
| 2,916,805 | Plesser | Dec. 15, 1959 |
| 2,946,026 | Rollefson | July 19, 1960 |